Inventor
Eldred H. Natschke
By Mann, Brown & McWilliams
Attys.

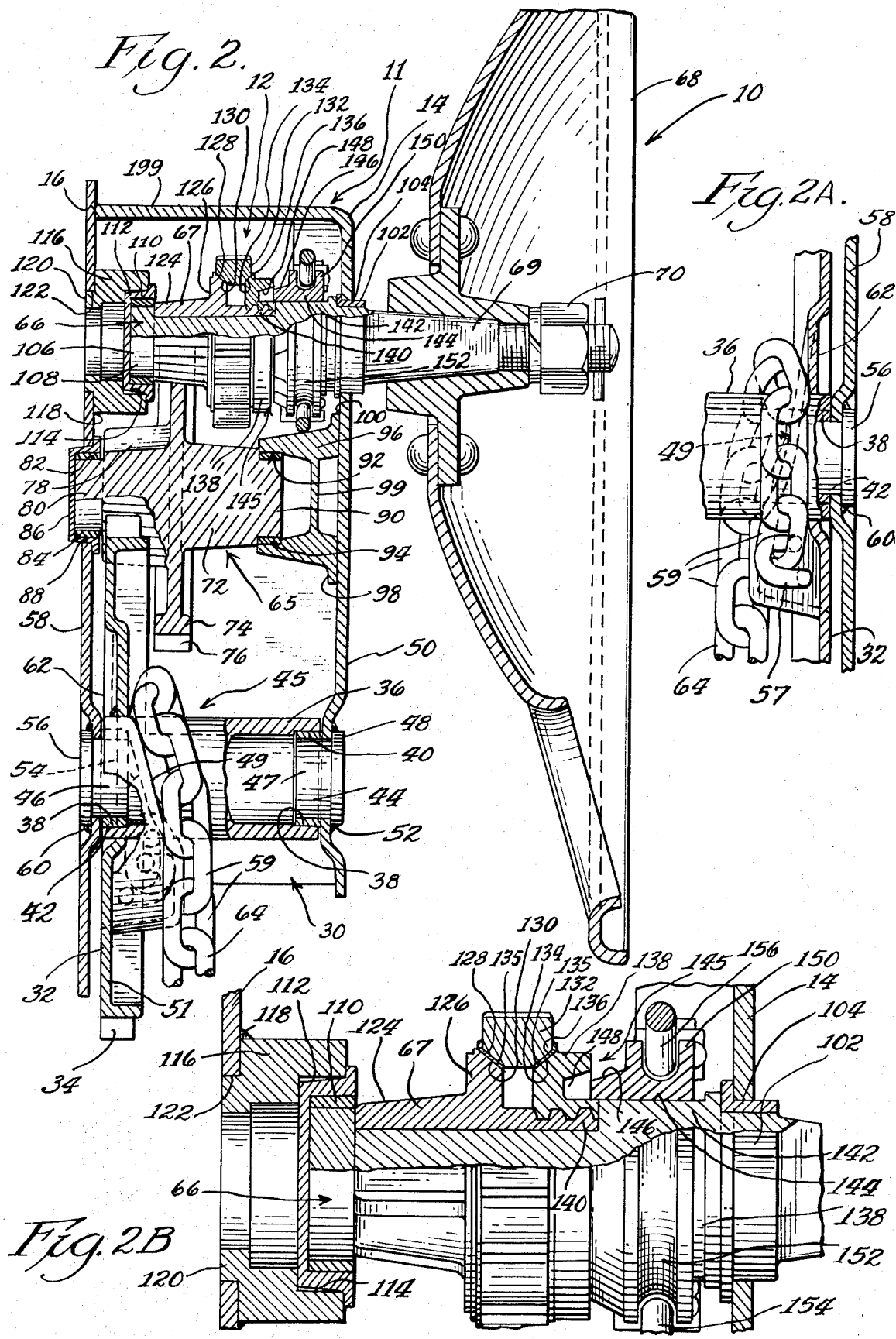

Sept. 22, 1970     E. H. NATSCHKE     3,529,488

HIGH POWER HAND BRAKE AND RELEASE MECHANISM THEREFOR

Filed July 24, 1968     3 Sheets-Sheet 3

Inventor
Eldred H. Natschke
By Mann, Brown & McWilliams
Attys.

United States Patent Office 3,529,488
Patented Sept. 22, 1970

3,529,488
HIGH POWER HAND BRAKE AND RELEASE
MECHANISM THEREFOR
Eldred H. Natschke, Bourbonnias, Ill., assignor to Universal Railway Devices Company, a corporation of Illinois
Filed July 24, 1968, Ser. No. 747,190
Int. Cl. G05g 1/08
U.S. Cl. 74—505                               2 Claims

ABSTRACT OF THE DISCLOSURE

A vertical wheel hand brake which is especially arranged to provide the increased power needed for 125 ton cars and up in weight, and includes a special gear cluster interposed between the brake drum and the brake ratchet wheel pinion for this purpose. The hand brake also includes a ratchet wheel holding pawl improvement involving a spring biased pawl, a revised brake release arrangement providing for improved control over movement of the clutch mechanism involved, and an improved manner of securing the brake chain to the hub so that the chain links will always be presented to the hub at 45 degrees with respect thereto.

---

This invention relates to a vertical wheel hand brake for railroad cars, and more particularly to improvements in the hand brake arrangements shown in U.S. Patents 2,318,569 and 2,848,083.

The recent trend towards larger capacity freight cars have required that there be available hand brake equipment that is capable of accommodating cars of 125 tons and up. This involves operational requirements that are not available in conventional hand brakes.

A principal object of this invention is to provide an improved hand brake arrangement that is especially suited for cars of 125 tons and up in size.

Another principal object of the invention is to improve on conventional vertical wheel hand brakes in general.

Still another object of the invention is to provide a vertical wheel hand brake arrangement having a holding pawl arrangement that is independent of gravity, to provide a controlled and full release arrangement for such hand brakes that insures uniform operating characteristics, and to provide a hand brake arrangement that is economical of manufacture, convenient to install and use, and adapted for application to a wide variety of car types.

Other objects, uses, and advantages will be obvious or become apparent from a consideration of the following detailed description and the application drawings.

In the drawings:

FIG. 2 is a vertical sectional view of the hand brake shown in FIG. 1 on a somewhat smaller scale, and with parts shown in elevation;

FIG. 2A is a fragmental view of the brake drum and its associated chain taken from the rear side of FIG. 2, better illustarting the particular angulation of the chain anchor that is employed in accordance with this invention;

FIG. 2B is a fragmental view better illustrating the operating shaft shown in FIG. 2, and the parts associated therewith;

However, it is to be distinctly understood that the specific drawing illustrations provided are supplied primarily to comply with the requirements of the patent code, and that the invention may take other embodiments that will be obvious to those skilled in the art.

Figure 1:
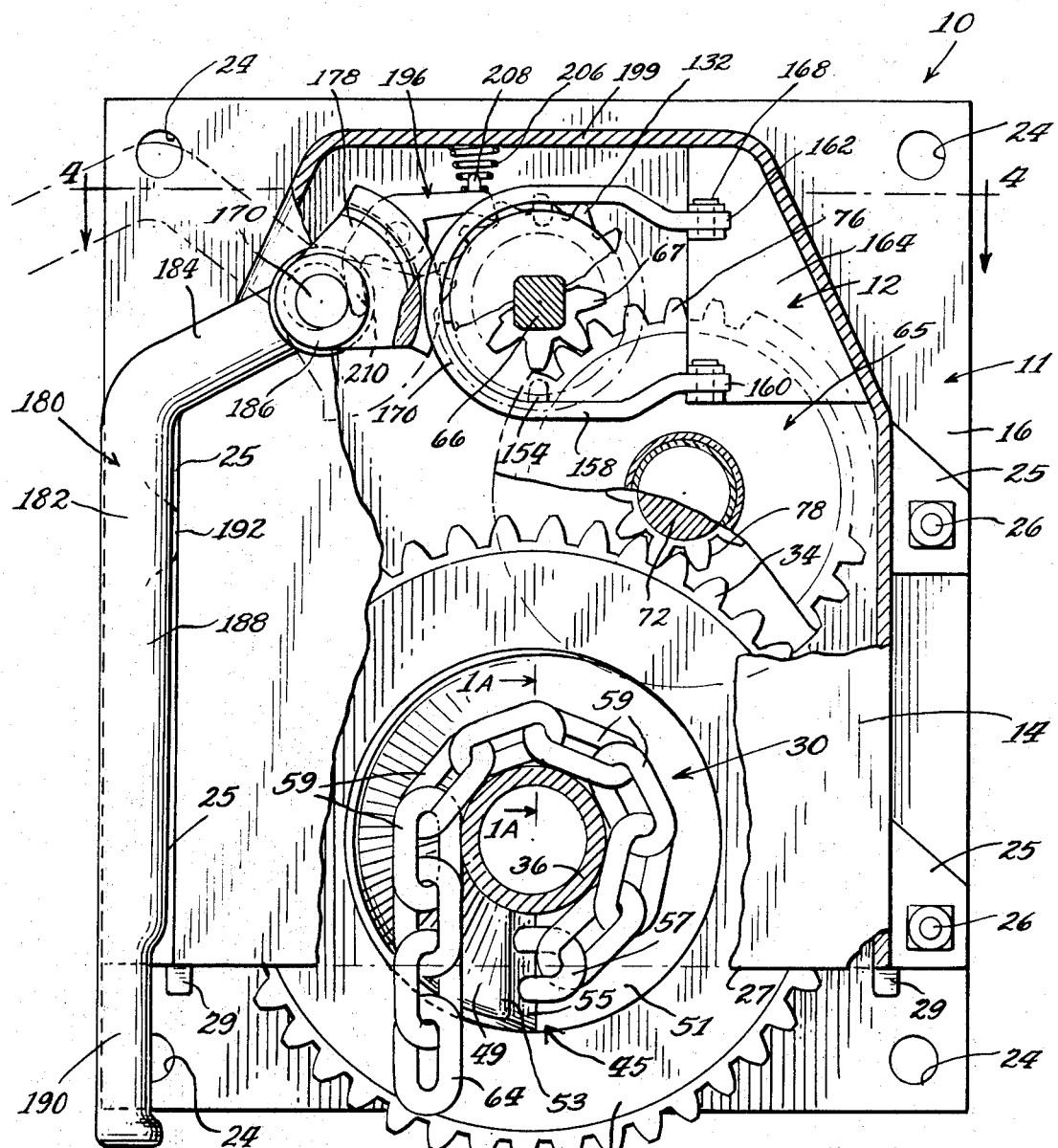
FIG. 1 is a front elevational view of the improved hand brake with parts broken away to expose other parts.

Reference numeral 10 of FIGS. 1 and 2 indicates one embodiment of the invention positioned as it would be applied to a railroad car, in which the brake operating mechanism is indicated at 12 and is contained in a housing 11.

The housing is in two sections comprising a front casing 14 and a back section or attaching plate 16 formed with appropriate bolt holes 24 for receiving appropriate attachment bolts or the like (not shown) to secure the back plate or section to the car.

The front casing 14 is secured to the back section or attaching plate 16 by appropriate bolts indicated at 26 applied to lugs 25 that are integral with the casing 14 on either side thereof. Casing 14 at its lower edge 27 engages stops 29 (see FIG. 1) fixed to back section 16 (as by welding).

The major portion of the brake operating mechanism 12 is mounted within casing 14 and in such manner as to be removable with it.

The brake operating mechanism 12 comprises a brake drum 30 and includes a flange 32 affixed thereto and provided with an integral gear 34 at its rim for turning the drum 30.

In the form shown, the drum 30 takes the form of a tubular member 36 that is counterbored at its ends as at 38 to receive brass bushings 40 and 42, respectively.

The tubular member 36 in the assembled relation of the drum 30 is journaled between a pair of stub shafts 44 and 46 on which the respective bushings 40 and 42 are received, with the stub shafts being respectively secured to the front casing and back section, respectively. In the form shown, the stub shaft 44 includes a cylindrical portion 47 that substantially complements the internal diameter of bushing 40, and end flange 48 that abuts against the face 50 of front casing 14 and is welded thereto as at 52.

The stub shaft 46 is similarly constituted, it comprising cylindrical portion 54 having an outer diameter that substantially complements the inner diameter of bushing 42, and a flange portion 56 that abuts the face 58 of back section 16 and is welded thereto as at 60.

The drum flange 32 is welded to tubular member 36 as at 62, and drum 30 is provided with a chain anchor and guide arrangement 45, which, in the form shown, comprises the drum flange 32 being formed to define helical surface 49 that is advanced forwardly of the plane of planar surface 51 of drum flange 32 to guide the chain 64 into the customary spiralled winding relation on drum 30 as the initial portion of the chain 64 is wound on the drum. The surface 49 of the drum at its most axially advanced portion 53 terminates in an angled shoulder 55 to which is applied by welding or the like the U-shaped chain anchor 57 that is disposed so that its plane is angled at about 30 degrees relative to the transverse section of the drum tubular member 36, and anchor 57 angles forwardly of the housing 11. This positioning of anchor 57 results in the chain 64, in extending therefrom and about drum 30, being presented to the drum tubular member or hub 36, with the links 59 thereof at 45 degrees with respect to the hub 36 (as indicated by diagrammatic FIG. 1A) and with respect to its axis of rotation. This insures that the brake chain 64 will lie flat against the drum hub 36, with the links 59 thereof in stabilized relation thereto, as all the links 59 will assume approximately the oppositely disposed, mutually bracing, 45 degree angle relation indicated as the chain is wound on the drum. Heretofore on occasion chain links have engaged the hub at an angle of 90 degrees, and under stress tend to flop one way or another with resulting overstressing of the brake parts, and the illustrated arrangement avoids this possibility.

The gear 34 in accordance with this invention meshes with power multiplying gear cluster 65 which in' turn meshes with a pinion 67 of operating shaft 66 to which the hand wheel 68 is keyed in any suitable manner. In the form shown, the operating shaft 66 is formed with an outwardly extending tapered portion 69 of quadrilateral transverse cross-sectional configuration on which the hand wheel 68 is received and against which the hand wheel is clamped by appropriate nut 70 or other suitable restraining means.

The gear cluster 65 comprises a forged shaft member 72 defining a flange portion 74 provided with an integral gear 76 at its rim for meshing with the pinion 67 of operating shaft 66. Shaft member 72 is formed to define pinion 78 that meshes with the drum gear 34.

The end portion 80 of shaft member 72 is formed with a cylindrical portion 82 which receives brass bushing 84 mounted in a dished bearing retainer 86 which is received in opening 88 of the housing back section 16.

The other end portion 90 of shaft member 72 is formed with cylindrical portion 92 which receives brass bushing 94 mounted in a shaft supporting forged member 96. The member 96 is frustoconical in transverse cross-sectional configuration and is formed with a flange portion 98 at one end thereof that is fixed to the housing section as by welding as at 100. Member 96 defines a reinforcing flange 99 extending transversely thereof.

The operating shaft 66 includes an enlarged cylindrical portion 102 intermediate the ends thereof which is journaled in brass bushing 104 mounted in the casing 14. The end portion 106 that is disposed within the housing 11 is enlarged as at 108 (see FIG. 2) and is received within brass bushing 110 mounted within dished retainer 112 that is seated in recess 114 of a support member 116 that is secured to the back section 16 as by welding at 118. Support member 116 includes an annular extension 120 that seats within the opening 122 of the back section that is concentric with respect to the axis of rotation of the shaft 66 whereby the member 116 will be properly centered with respect to the shaft.

As indicated in FIG. 2, the pinion 67 is rotatably mounted on the shaft 66 and comprises a gear portion 124 and a clutch collar portion 126 formed with a conical friction face 128 that is intended to cooperate with similarly formed friction face 130 of ratchet wheel 132. The other side of the ratchet wheel 132 is formed with a similar friction face 134 that is intended to cooperate with friction face 136 of nut 138 that is threadedly mounted on the threaded portion 140 of the pinion 67. In practice, the friction clutch faces 128 and 130 and 134 and 136, respectively, are separated by annular brass cone members 135 (see FIG. 2B) that complement the respective surfaces therebetween and are free to float with respect thereto.

The operating shaft 66 is formed with a hex shaped portion 142 on which is slidably mounted a jaw clutch sleeve 144 provided with jaws 146 that are proportioned and spaced to fit into complementing recesses 148 formed in the nut 138 whereby a toothed or jaw clutch 145 between the operating shaft 66 and the nut is formed.

In accordance with this invention, the clutch sleeve 144 is provided with a radial flange 150 which is formed about its periphery with a groove 152 that receives a pair of oppositely directed, diametrically opposed projections 154 and 156 (see FIG. 3) of an actuating member 158.

The actuating member 158 comprises a generally U-shaped element having its ends 160 and 162 respectively pivoted to an appropriate flange or mounting plate 164 that forms a part of casing 14. In the specific form shown, the flange or mounting plate 164 is provided with spaced pairs of lugs 166 to which the said ends 162 are pivoted by suitable pins 168. Member 158 is shaped so that its connecting or bight portion 170 is in concentric relation to the configuration of the clutch sleeve 144, and in accordance with this invention, said connecting portion 170 is moved axially of shaft 66 to connect and disconnect the jaw clutch 145.

In the form illustrated, the arrangement for actuating the member 158 comprises a release shaft 172 journaled between casing 14 and a suitable bracket plate 174 that is mounted within the casing 14. Keyed to the shaft 172 is a cam member 176 including a flange portion 178 defining a circular rim 180 that is formed with a groove 182 that is concentrically disposed about the axis of rotation of the shaft 172, and which receives the connecting portion 170 of the member 158.

Figure 4:
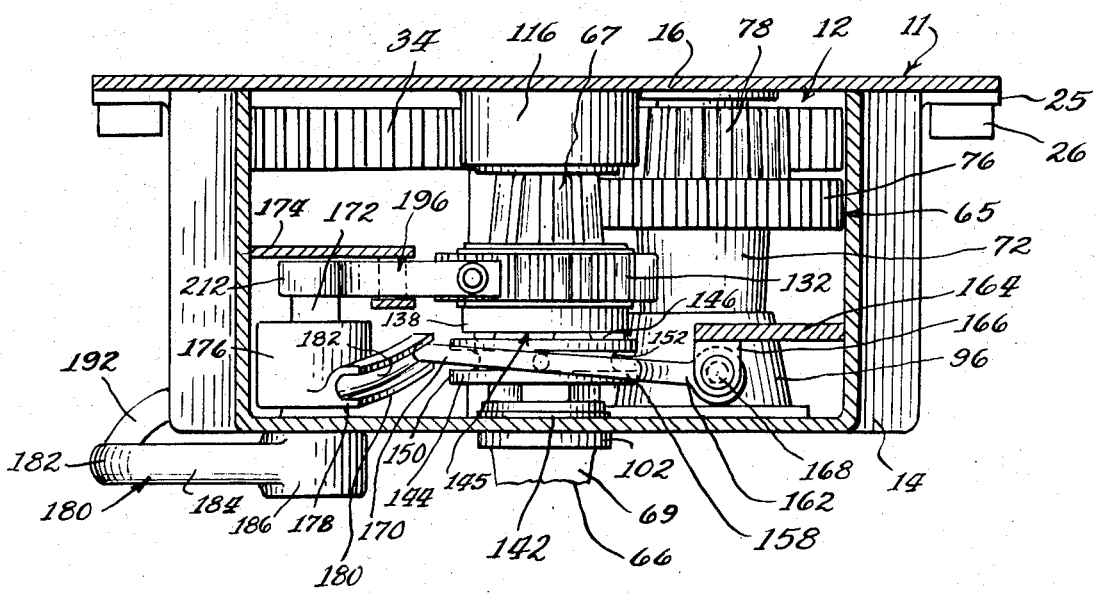
FIG. 4 is a cross-sectional view along line 4—4 of FIG. 1 further illustrating the parts shown in FIG. 3.

As indicated in FIG. 4, the flange portion 178 and its groove 182 are also curved axially of the shaft 172 to move the member 158 between its extreme jaw clutch closing and opening positions.

As indicated in FIGS. 1 and 4, the shaft 172 has keyed thereto a bottom release handle or arm 180 in the form of an L-shaped member 182 comprising a relatively short leg 184 formed with a socket portion 186 that is affixed to the shaft 172, and an elongate leg 188 formed with a hand grip portion 190 which is disposed to one side of the casing 14. The handle 180 in the full line position of FIG. 1 disposes the clutch sleeve 144 in full clutching relation with the nut 138, and when moved to the broken line position of FIG. 1 fully separates the clutch jaws 146 from the nut 138 for full release of the brake.

The handle 180 includes a suitable abutment 192 that engages the casing 14 under the action of gravity in the brake holding or locking position of FIG. 1.

Operably associated with ratchet wheel 132 is a pawl 196 that in the form illustrated is pivotally mounted on bracket plate 174 (see FIG. 4). Pawl 196 comprises a first arm portion 198 (see FIG. 3) formed with a toothed end portion 200 proportioned to engage inbetween adjacent teeth 202 of the ratchet wheel 132, and specifically against the surface 204 thereof, it being understood that when the brake chain 64 is wound on the drum, shaft 66 rotates clockwise of FIGS. 1 and 3, and on release, the pinion 67 rotates in the other direction.

The arm 198 of pawl 196 is engaged by a frustoconical compression spring 206 that biases the pawl 196 into brake holding or locking relation with the ratchet wheel teeth 202. In the form shown, the pawl 196 is formed to define a projection 208 that serves as a locating device for the spring 206 and spring 206 is compressed between the pawl arm 198 and the top wall 199 of casing 14.

Figure 3:
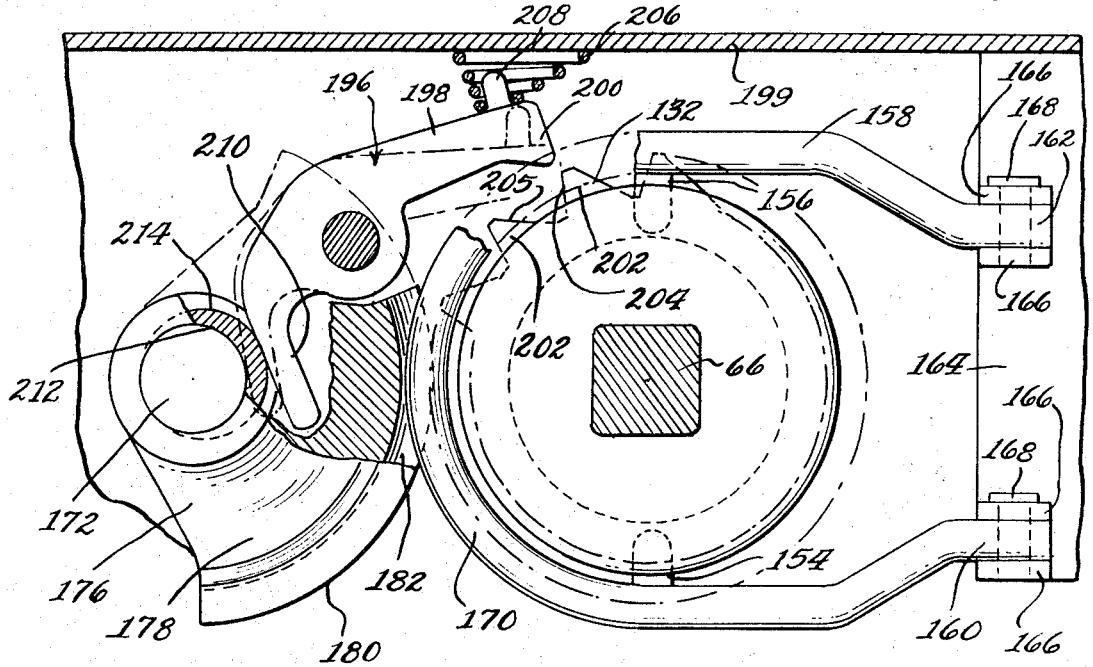
FIG. 3 is a fragmental view illustrating the operation of the brake ratchet wheel controlling pawl, and the mechanism for providing controlled release.

Pawl 196 is also formed with a cam follower arm 210 that is engaged by a cam member 212 keyed to release shaft 172 and formed to define cam surface 214, which surface 214 is proportioned to remain in contact with the pawl arm 210 in all positions of release arm 180 and move the pawl 196 between the broken line brake locking position and the full line brake release position shown in FIG. 3. In FIG. 1, the full line position shows the parts in brake locking relation, while in FIG. 3 the full line position shows the parts in brake release position, and it is preferred that the angle of throw be made approximately 40 degrees by suitably proportioning the parts that are actuated through rotation of the release shaft 172.

The operation of the hand brake is as follows: assuming that the hand brake is released, in its normal inoperative position the release handle 180 will be in the full line position of FIG. 1, which disposes the teeth of the clutch sleeve 144 into engagement with the recesses 148 of the nut 138, and disposes cam member 212 so that spring 206 biases arm 198 of pawl 196 into full locking relation with the teeth 202 of the ratchet wheel 132.

Figure 1A:
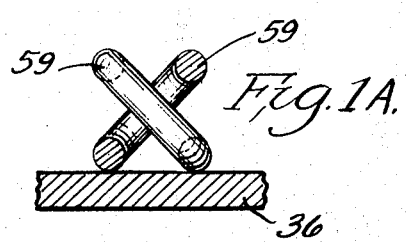
FIG. 1A is a fragmental cross-sectional view substantially along line 1A—1A of FIG. 1 illustrating the manner in which the brake chain links lie on the brake drum in being wound up on same.

Rotation of the hand wheel 68 in the direction to wind up the brake chain (clockwise of FIG. 1) will rotate nut 138 towards the clutch collar 126 of pinion 67 and bind the ratchet wheel 132, the pinion 67, and the operating shaft 66 into one rotating unit which will rotate the drum 30 in the direction to wind up the brake chain 64 that is connected in the usual manner to the brake rigging for applying the brakes manually through hand brake 10. During the winding up operation, the pawl 196 pivots back and forth under the action of teeth 202 as the toothed end 200 rides over the teeth surfaces 205 and drops down behind the next adjacent toothed surface 204. This continues until the brake is set, the release handle 180 remaining in the full line position of FIG. 1, with the result that when the brake is wound up and the pawl 196 is returned to its full line position of FIG. 1, the brake is fully set, with the chain links 59 having the relation with respect to the brake drum that is illustrated by FIG. 1A.

If it is desired to gradually release the brake, the hand wheel 68 is rotated in a counterclockwise direction a slight amount, which will have the effect of loosening the nut 138 and thus the clutching surfaces between the ratchet wheel 132 and pinion 67, so that the pinion 67 will rotate counterclockwise (as viewed in FIG. 1) with respect to the ratchet wheel and shaft 66 under the control of the operator, who by slight loosening or tightening movements (achieved by rotating hand wheel 68 in the appropriate direction) can increase or decrease the frictional drag on the rotational movement of the pinion 67 and thus fully control brake release.

When it is desired to provide a free release of the brakes, the release handle 180 is grasped and moved from the full line position of FIG. 1 to the broken line position thereof, which pivots pawl 196 from the broken line position of FIG. 3 to the full line position of the same figure and moves actuating member 158 to disconnect jaw clutch 145, thus moving the toothed arm end 200 of the pawl out of contact with the ratchet wheel and permitting the ratchet wheel, pinion 67, and brake drum freely rotate to release the brakes.

After the brake chain has fully unwound, the handle 180 is released for return to the full line position of FIG. 1.

In a specific commercial embodiment of the invention, the hand wheel 68 has a radius of 11 inches as compared to a radius of 2½ inches for the brake drum from its center line to the center line of the chain in the position that the first turn of the chain takes about the drum as it is being wound up. Gears 34 and 76 and pinions 67 and 78 are provided with four pitch teeth, with the gear 34 having forty-eight teeth, the gear 76 having twenty-eight teeth, the pinion 78 having ten teeth, and the pinion 67 having eight teeth. This will permit the hand brake to provide an effective force for brake applying purposes of from an average of about 6000 to an average of about 7500 pounds with a 125 pound pull applied to the rim of the hand wheel 68.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a hand brake for railroad cars comprising a housing adapted to be mounted on a car, an operating shaft journalled in the housing, pinion and ratchet means mounted on the shaft with said means comprising a pinion rotatably mounted on the shaft and including a threaded portion, a nut mounted on the pinion threaded portion, a ratchet wheel rotatably mounted on the pinion between friction clutch faces of the pinion and nut and including friction clutch faces on either side thereof adapted for cooperation with corresponding friction clutch faces of the pinion and nut respectively, a jaw clutch shiftably keyed to said operating shaft and adapted to clutch and unclutch with respect to said nut on shifting movement thereof axially of said shaft, brake holding means including pawl means mounted in said housing for holding said brake, hand lever release means for controlling said pawl means and for clutching and unclutching said jaw clutch including a release handle for operating said release means, a winding drum journalled in said housing and operatively coupled to said pinion, and means for rotating said operating shaft to wind up the brake drum, the improvement including:

an actuator member coupled to said jaw clutch at at least two positions disposed on either side of the operating shaft and mounted to move said jaw clutch axially of said operating shaft between clutching and unclutching positions with respect to said nut, and a cam member keyed to said release handle and including a cam portion shaped to engage said actuator member and cam same between said positions on movement of said release handle, said jaw clutch comprising a collar defining a rounded rim portion that is in circumambient relation to said operating shaft, said rim portion being formed to define a circular groove thereabout, said actuator member including a pair of diametrically opposed projecting portions received in said groove on either side of said shaft, said actuating member comprising a substantially U-shaped element including a pair of arm portions extending generally longitudinally of each other and connected by a bight portion, said arm portions being pivotally connected to said housing adjacent the ends thereof and carrying said projecting portions, said bight portion of said actuating members being engaged by said cam portion of said cam member.

2. The improvement set forth in claim 1 wherein:

an intermediate gear cluster unit is interposed between said winding drum and said pinion, said unit comprising:

a unitary member including a pinion in meshing relation with said drum gear, and a gear in meshing relation with said pinion of said pinion and ratchet means, and means for journalling said unitary member in said housing, said operating shaft, said unit, and said winding drum being oriented such that rotation of the operating shaft of a clockwise direction, when the hand brake is mounted in its operating position on a car, will rotate said winding drum in a clockwise direction to wind up the chain thereon, a brake chain and means for making one end of same fast to said drum, said drum gear including a spiraled portion extending axially of said drum for guiding the brake chain into spiraled winding relation to the drum and terminating in a shoulder at the portion thereof that is spaced the maximum from said drum gear axially of said drum, said means for making said one end of said brake chain fast to said drum including a U-shaped member fixed to said shoulder, said U-shaped member being angled with respect to the axis of rotation of said drum such as to present the links of said chain to said drum at 45 degrees with respect to the drum axis when the chain is wound on the drum.

(References on following page)

References Cited

UNITED STATES PATENTS

| | | | |
|---|---|---|---|
| 1,926,175 | 9/1933 | Richards | 74—505 |
| 2,318,569 | 5/1943 | Camp et al. | 74—505 |
| 2,322,398 | 6/1943 | Smith | 74—505 X |
| 2,848,083 | 8/1958 | Wilson | 192—16 |
| 3,173,305 | 3/1965 | Mersereau | 74—505 |
| 3,390,590 | 7/1968 | Natschke et al. | 74—505 |
| 3,425,294 | 2/1969 | Klasing | 74—505 |

MILTON KAUFMAN, Primary Examiner

U.S. Cl. X.R.

192—16